United States Patent [19]
Beal et al.

[11] Patent Number: 5,568,491
[45] Date of Patent: Oct. 22, 1996

[54] KNOWLEDGE BASED RESOURCE MANAGEMENT

[75] Inventors: David G. Beal, Longmont; Joetta S. Chikira; Fletcher L. Hill, both of Louisville; Nancy R. Jurestovsky, Golden; Michael R. Stephens, Westminster, all of Colo.

[73] Assignee: Storage Technology Corporation, Louisville, Colo.

[21] Appl. No.: 230,329

[22] Filed: Apr. 20, 1994

Related U.S. Application Data

[63] Continuation-in-part of Ser. No. 695,570, May 3, 1991.
[51] Int. Cl.$^6$ .......................... G06F 11/22; G06F 11/267
[52] U.S. Cl. ................. 371/30; 371/20.1; 395/182.02; 395/183.02
[58] Field of Search .................. 371/15.1, 20.1; 395/183.02, 182.02

[56] References Cited

U.S. PATENT DOCUMENTS

| | | | |
|---|---|---|---|
| 4,827,411 | 5/1989 | Arrowood et al. | 395/600 |
| 4,864,492 | 9/1989 | Blakely-Fogel et al. | 395/54 |
| 4,937,825 | 6/1990 | Ballard et al. | 371/20.1 |
| 4,961,224 | 10/1990 | Yung | 380/25 |
| 4,972,453 | 11/1990 | Daniel, III et al. | 379/10 |

OTHER PUBLICATIONS

McQuillan, J. et al., "A Review of the Developement and Performance of the ARPANET Routing Algorithm", IEEE Trans. on Communications, vol. COM-26, No. 12, pp. 1802-1810 Dec. 1978.

Marques, T., "A Symptom-Driven Expert System for Isolating and Correcting Network Faults", IEEE Communications Mag., vol. 26, No. 3, pp. 6-14 Mar. 1988.

Ross, M. et al., "An AI-Based Network Management System", Proc. Seventh Ann. Int. Phoenix Conf. on Computers and Communications, pp. 458-461 Dec. 1988.

Sutter, M. et al., "Designing Expert Systems for Real-Time Diagnosis of Self-Correcting Networks", IEEE Network Mag., pp. 43-51 Sep. 1988.

Goldman, J., et al, "Integrated Fault Managment in Interconnected Networks", *Integrated Network Management I*, Meandzija, B. et al. eds., Elsevier Science, 1989, pp. 333-344.

Sylor, M., "Guidelines for Structuring Manageable Entities", *Integrated Network Management I*, Meandzija, B., et al. eds., Elsevier Science, 1989, pp. 169-183.

*Primary Examiner*—Stephen M. Baker
*Attorney, Agent, or Firm*—Duft, Graziano & Forest, P.C.

[57] ABSTRACT

The knowledge based system identifies the occurrence of a failure within the customer equipment and functions using its rules, hypotheses and collected data to isolate the functional resource which is the source of the error in the customer equipment and, whenever possible, "fence" or isolate the failed functional resource that has caused the error. In addition, the knowledge based system makes use of resource related rules to remove a resource or set of resources available for concurrent other failure management operations. The resource related rules allow resources to function in any one non-operational or operational mode or to functional simultaneously in multiple non-operational modes.

4 Claims, 10 Drawing Sheets

KNOWLEDGE BASED RESOURCE MANAGEMENT

CROSS-REFERENCE TO RELATED APPLICATIONS

This application is a continuation-in-part of a patent application titled Knowledge Based Resource Management, Ser. No. 07/695,570, filed May 3, 1991.

FIELD OF THE INVENTION

This invention relates to maintenance systems, and in particular, to the use of a field replaceable unit fencing action within a multiply redundant, fault tolerant customer subsystem to dynamically manipulate individual functions within the subsystem and maximize resources which are available to the customer, while the maintenance system reconfigures around failures and processes concurrent diagnostic submissions, IML (initial microprogram load) protection, and 'hot-pluggable FRU' insertion.

PROBLEM

Electronic device manufacturing techniques make it possible to incorporate a significant amount of functionality into a very small physical area. Customer systems now contain a great many functions on very few field replaceable units. Even though the reliability of individual electronic devices has improved, increased device density and functionality often increase the risk of catastrophic failure from any fault source. It is therefore often desirable to use redundant critical functional elements in the customer system.

However, the use of a multiplicity of redundant functional elements creates an entirely new class of problems. In prior art maintenance systems, it is possible to remove or "fence" entire redundant functional elements from service by electrically disabling paths to or from such elements so that alternate equipment is available in case a primary equipment is lost due to a failure. The fencing capability alone does not permit efficient resource management. The devices contained within a fence must be precisely selected to avoid disabling elements that are required to maintain acceptable levels of system operation. In addition, only a single fence can be maintained, rendering diagnosis of multiple concurrent failures a difficult task. Furthermore, the fence procedure is applied retrospectively, attempting to recreate the unknown set of conditions that were extant at the time of the failure. It is often necessary to remove the entire customer system from operation in order to diagnose a failure within a single element. Thus, fencing is a valuable maintenance tool, but one with significant limitations in capability.

The present state of the art in device density demands that the management of resources be efficiently maintained at the level of the resource itself, often within a very small portion of a single field replaceable unit. It is very difficult within a multiply redundant, fault tolerant customer system to dynamically manipulate individual functional elements within the customer system so that any single functional element can operate in multiple non-operational states simultaneously to maximize resources which are available to the customer.

SOLUTION

The above described problems are solved and a technical advance achieved in the field by the knowledge based resource management system of the present invention which functions in a failure management environment to provide efficient and timely configuration of functional resources within a customer equipment. The knowledge based system provides the failure evaluation function through the use of an expert or knowledge based system which is installed in the customer equipment. The knowledge based system makes use of a set of rules and hypotheses to operate on data collected from various points within the customer equipment to monitor the operational integrity of the customer equipment. The knowledge based system identifies the occurrence of a failure within the customer equipment and functions using its rules, hypotheses and collected data to isolate the functional resource which is the source of the error in the customer equipment and, whenever possible, "fence" or isolate the failed functional resource that has caused the error. In addition, the knowledge based system makes use of resource related rules to remove a resource or set of resources from customer operation while making those resources available for concurrent other failure management operations such as diagnostics, testing of redundant resources, or functional bringup.

The failure evaluation process generates a set of data indicative of the domain node-path of all functional elements that were active during a failure that occurs in the customer equipment. A series of retry attempts are executed to attempt to successfully complete the requested operation, and each failed retry itself produces a similar set of data indicative of its associated domain node-path of functional elements that were active during the failure in the customer equipment. These sets of node-path data are used with the original fault symptom code, which indicates the type of problem observed, to compare the detected failure with the list of open composite failure events, indicative of all known failures in the customer equipment, to identify suspect failing resources in terms of a resource node-path domain. This process thereby correlates node-path data with associated fault symptom codes and historical failure data to isolate a single most likely failed resource in the customer equipment, independent of craftsperson intervention. The process then uses rules associated with each of the nodes identified within a node-path domain to impose a combination of logical and/or electronic barriers to continued customer use of those nodes. This permits efficient concurrent customer use of the nodes which are not affected by the failure.

The failure evaluation process may also initiate a test sequence to establish the functional integrity of a resource which is identified within its node-path domain. The test sequence consists of one or more tests, each of which contains a node-path domain within which that test operates. The process then uses rules associated with each of the test nodes to impose a combination of logical and/or electronic barriers to continued customer use of those nodes, independent of craftsperson intervention. This permits efficient concurrent customer use of the resources which are not affected by testing.

The failure evaluation process may also initiate a functional bringup of a resource which is identified by that resource's node-path domain. When the functional bringup of a resource affects additional resources which may be shared by other customer operations, a node-path domain identifies those resources. The process then uses rules associated with each of the nodes which identify those resources to impose a combination of logical and/or electronic barriers to continued customer operation of those nodes, independent of craftsperson intervention. This permits efficient concurrent customer use of those resources which are not affected by bringup.

The failure evaluation process may also identify resources within the customer equipment which are redundant and are not required for efficient operation of the customer equipment, or which are redundant and must not be placed in operation with an additional identically redundant resource. These resources are identified by their node-path domain. The process then uses rules associated with each of the nodes identified in the resource node-path domain to impose a combination of logical and/or electronic barriers to continued customer operation of those nodes, independent of craftsperson intervention.

The resource related rules allow resources to function in any one non-operational or operational mode or to function simultaneously in multiple non-operational modes. Non-operational modes include the initialization fenced mode, the field replaceable unit replacement mode, the functional error detection mode, the diagnostic mode, and the uninstalled mode. Each node is treated and monitored as an independent state machine. This mechanism has the advantage of permitting the dynamic association of a node with a domain consisting of a set of nodes in order perform a general non-operational function. Additional associations with other non-operational domains may be created and dissolved as needed. Each node is manipulated individually and independently through its various states as it becomes associated among domains.

Additionally, when such a redundant resource is placed in reserve, or when a new function is added (through FRU replacement or other means), the process may place that reserved or new resource in functional operation when circumstances dictate by examining the node-path map associated with the reserved or new resource. The process then uses rules associated with each of the nodes identified in the resource node-path domain to release the combination of logical and/or electronic barriers to continued customer operation of those nodes, independent of craftsperson intervention. This permits the reserved or new nodes to be utilized operationally by the customer.

DETAILED DESCRIPTION

Figure 1:
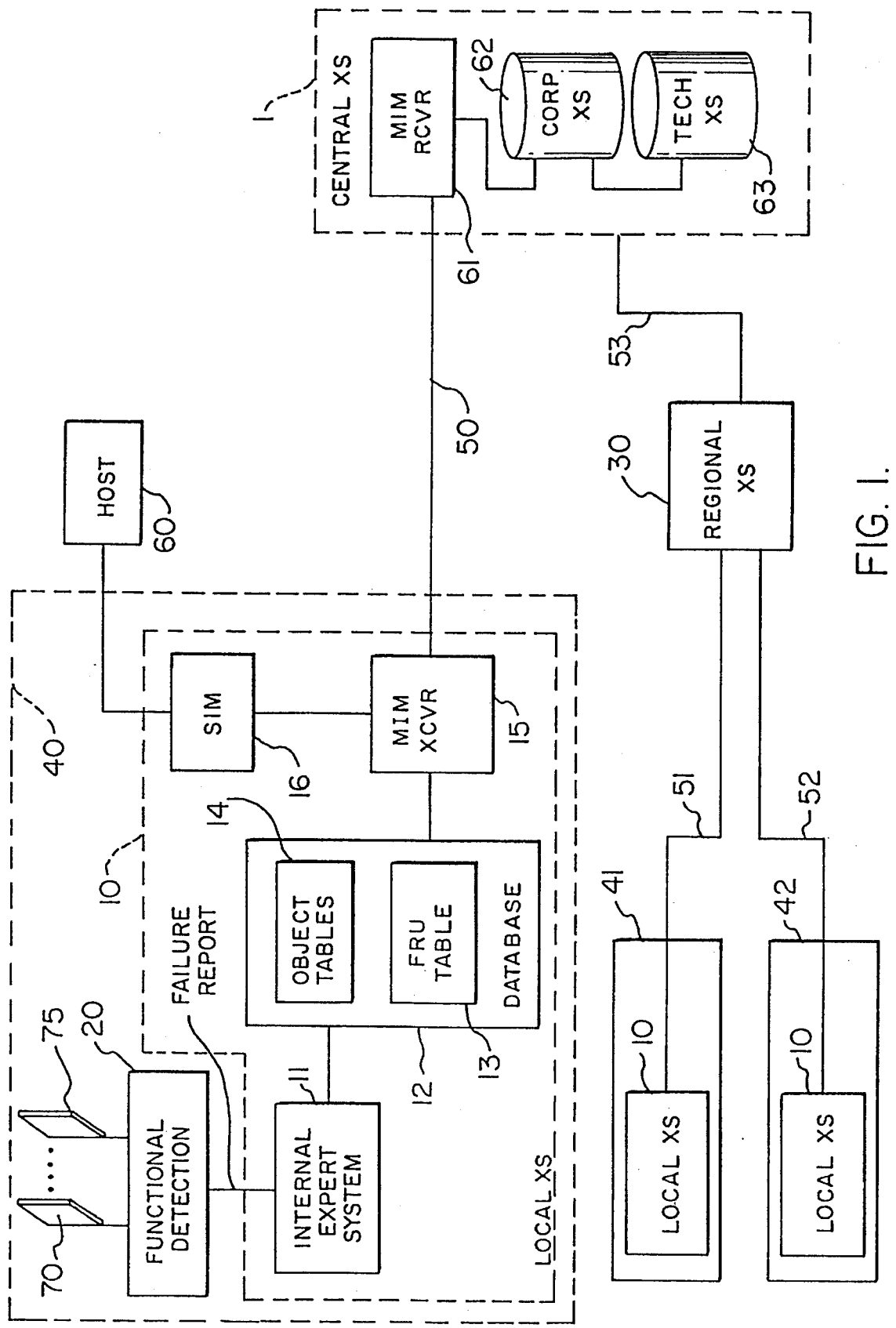
FIG. 1 illustrates in block diagram form a distributed hierarchical machine initiated maintenance system.

FIG. 1 illustrates in block diagram form the hierarchical distributed knowledge based machine initiated maintenance system. A plurality of customer equipment 40–42 are illustrated connected to a central maintenance system 1 via corresponding communication links 50–53. Included in each customer equipment 40 or adjunct thereto is a machine initiated maintenance system 10 which functions to communicate with central maintenance system 1 in order to provide instantaneous and efficient error identification reporting and collection. Each customer equipment 40 can be directly connected to the central maintenance system 1 or, alternatively, a plurality of customer equipments 41, 42 can be connected to a regional maintenance system 30 and a plurality of the regional maintenance systems 30 can be connected to the central maintenance system 1. The maintenance system is hierarchically arranged with local customer equipment 40–42 being serviced by its associated internal maintenance system 10 and a pool of customer equipments 41, 42 and their associated maintenance systems 10 being serviced by a corresponding regional maintenance system 30. A pool of regional maintenance systems 30 are then connected to the central maintenance system 1. The sophistication and complexity of each level of the maintenance system can be selected to correspond to economic factors, such as the installed worth of the equipment that is so maintained. Therefore, the local maintenance system 10 may be of lesser complexity than the regional maintenance system 30 since it must be replicated in each customer equipment 40. The regional maintenance system 30 can be of increased complexity since it serves a plurality of customer equipments 41–42 and views the data collected from all of these systems to thereby obtain a broader perspective on error conditions. Similarly, the central maintenance system 1 can be a sophisticated and expensive system since it serves all installed customer equipment 40–42 and supports all the regional maintenance systems 30. The central maintenance system 1 maintains records of all failures that have occurred in all customer equipment 40–42 and can therefore detect failure patterns using this data that are beyond the scope of the ability of the regional 30 or local maintenance systems 10 due to the limited pool of data available to these systems.

Customer Equipment Architecture

Customer equipment 40 is typically constructed of a plurality of field replaceable units (FRU) 70–75, each of which performs a designated, well defined function. Additional elements may be provided in customer equipment 40 that are not field replaceable units, in that a craftsperson can not simply repair or replace these elements. However, for the purpose of simplicity of description, all functional subelements contained within customer equipment 40 are designated as field replaceable units whether indeed they can be physically replaced by a craftsperson in the traditional field replaceable unit sense. The physical configuration of the customer equipment 40 is not particularly pertinent to the concept of this invention and the term field replaceable unit should not be construed as any limitation on the operational abilities of the subject system.

Within each customer equipment 40 is a number of functional detection circuits 20 that monitor the operational status of the field replaceable units (70–75) contained in customer equipment 40. The functional detection circuits 20 can be part of field replaceable units 70–75 or separate elements and consist of the error detection, diagnostic and maintenance apparatus that is well known in the art. This apparatus is not disclosed in any further detail for the purpose of simplicity. The hardware and software that comprise functional detection circuits 20 transmit a failure report to local maintenance system 10 whenever the functional detection circuits 20 determine that one or more of the hardware or software components contained within customer equipment 40 has failed.

In order to enhance the effectiveness of the failure report process, the report is formulated to reflect the customer equipment architecture which typically is a plurality of processes which operate over paths that connect nodes. Each path interconnects at least two nodes and may incorporate elements of data transmission, process control signals, or both. The nodes typically incorporate functions which exist as subsets of physical field replacement units 70–75. It is possible for a node to be contained wholly within a field replaceable unit 70–75, or on a boundary of a field replaceable unit 70–75 interfacing with a path, or as a function which spans elements of more than one field replaceable unit 70–75.

Figure 5:
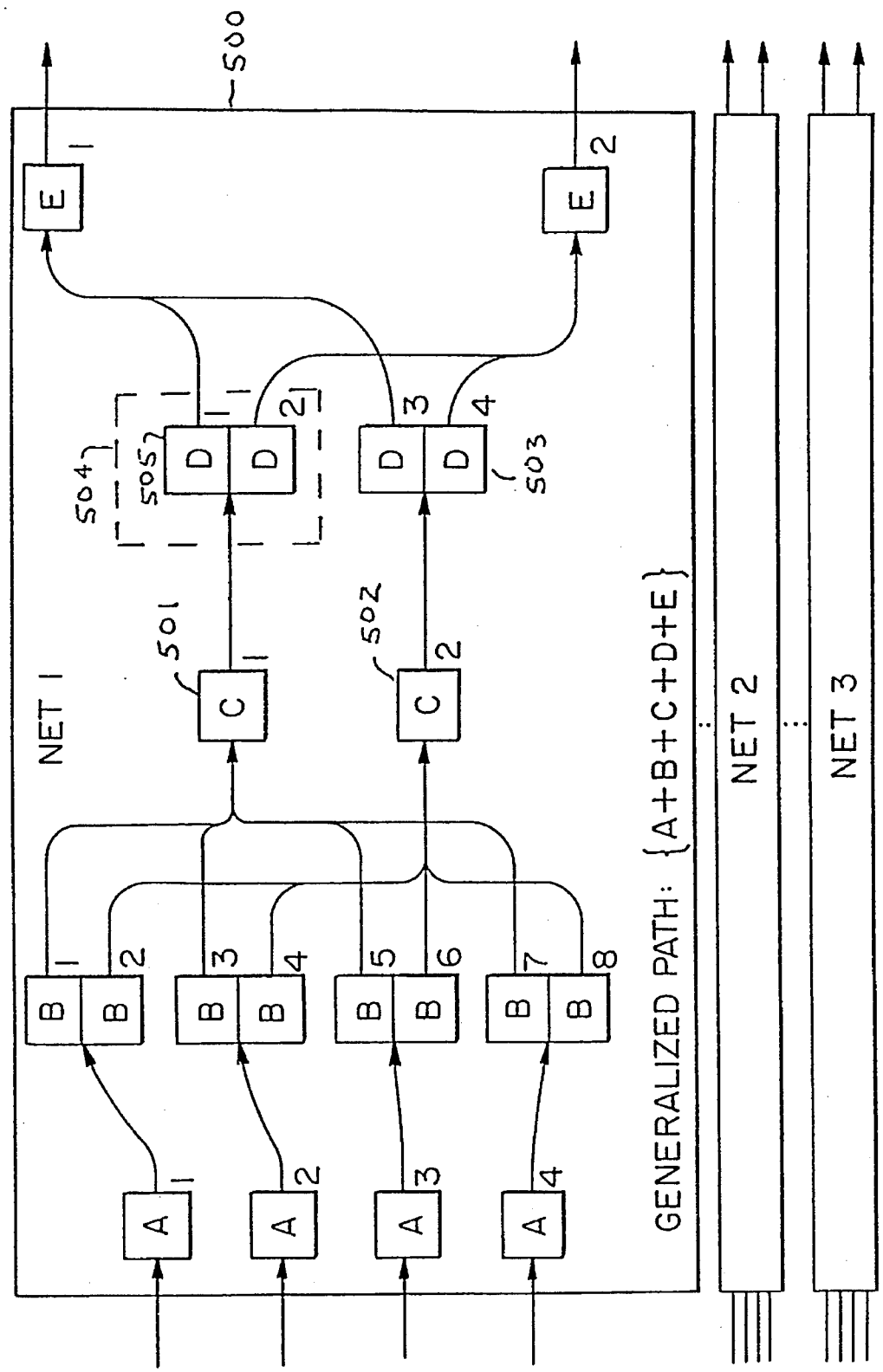
FIG. 5 illustrates the topology of the customer equipment.

In a manner analogous to the "normalization" of relational data, a composite generalized path may be described as containing all nodes necessary to describe a complete path. FIG. 5 illustrates this concept. A signal travelling from left to right through the circuit in NET 1 passes over a generalized path through the node network consisting of one node A, one node B, one node C, one node D and one node E. A generalized domain, then, is a map which shows a subset of the generalized path. Nodes B, C and D, for example, illustrate a generalized domain subset of the generalized path A, B, C, D, E.

An active process, however, uses a very specific path under very specific rules. For instance, if node C1 is a controlling processor which is to obtain a complete generalized path through the equipment, it must arbitrate for or otherwise obtain a node A, then a node B which is physically linked to a node A by a path, then a path to itself, and so on. One specific domain acquired by node C1, might be Node A1, Node B1, Node C1, Node D2, Node E2.

If an operation does not require an entire generalized path, the generalized domain describes the subset of the generalized path that is used. A generalized domain consisting of Nodes A, B, C and D, then, has a specific domain which describes exactly which node A, B, C and D are in use. One such specific domain might be Node A1, Node B1, Node C1 and Node D1.

The specific domain is used to describe any set of resources in use during an operation. If Node C1 detects an error during the operation described above, valuable information is obtained when Node C1 identifies the specific domain consisting of all resources which were in use at the time of the failure, in addition to indicating any symptoms of the failure.

Local Maintenance System Architecture

Local maintenance system 10 includes an internal expert system 11 and an associated database 12 that contains a table of all errors detected by functional detection circuits 20. Also included in maintenance system database 12 is a field replaceable unit dictionary 13. This element defines the field replaceable units 70–75 contained within customer equipment 40 and their interconnection such that this data and the operational diagnostic rules can be used by expert system 11 to diagnose and isolate the system failures to a single failed field replaceable unit 70–75 in customer equipment 40. Machine initiated maintenance transceiver 15 functions to establish and maintain a data communication connection with the central maintenance system 1 via the associated communication lines 50. Machine initiated maintenance transceiver 15 also provides a link with any other local error reporting systems such as Service Information Message (SIM) system 16 connected to host computer 60.

In operation, the functional detection circuits 20 identify failures that occur within customer equipment 40. The amount of data provided by functional detection circuits 20 is a function of the complexity of this apparatus. Local maintenance system 10 receives the failure report from functional detection circuits 20, and stores this data in database 12 to create a history log of all failures in customer equipment 40. Expert system 11 analyses the failure report received from functional detection circuits 20 using the rules and hypotheses 14 programmed into internal expert system 11. Internal expert system 11 can retrieve additional data from sensor and data collection points within customer equipment 40 or can activate failure evaluation capabilities contained within customer equipment 40 in order to collect additional data concerning the operational status of customer equipment 40 as well as perform dynamic reconfiguration (fencing) in order to prove or disprove a hypothesis, or remove a field replaceable unit from operation. The rule set 14 contained within internal expert system 11 as well as the field replaceable unit dictionary 13 enable the internal expert system 11 to isolate the source of the detected error to a single or at least a small number of field replaceable units 70–75 contained within customer equipment 40. Additionally, internal expert system 11 assigns a severity level to the detected failure as an indication of the appropriate level of maintenance response for this detected error.

The processing of errors is a function of the severity level assigned to the detected errors. Errors can be simply recorded and the identified failed field replaceable unit monitored or a low level alert generated to indicate to maintenance personnel that a noncritical unit within customer equipment 40 has failed. A communication connection can be established via machine initiated maintenance transceiver 15 to the regional 30 or central maintenance facility 1 to request the immediate dispatch of repair personnel when a critical error has been detected that significantly effects the functioning of customer equipment 40.

A second function performed by internal expert system 11 is the isolation function where the failed field replaceable unit 70 is disabled, or reconfigured, or isolated within customer equipment 40. The exact manner in which this is accomplished is a function of the architecture of customer equipment 40 and the nature of the field replaceable unit 70 that failed. The isolation function can be as simple as preventing the failed field replaceable unit 70 from being accessed by the control elements of customer equipment 40.

Internal Expert System Architecture

Figure 2:
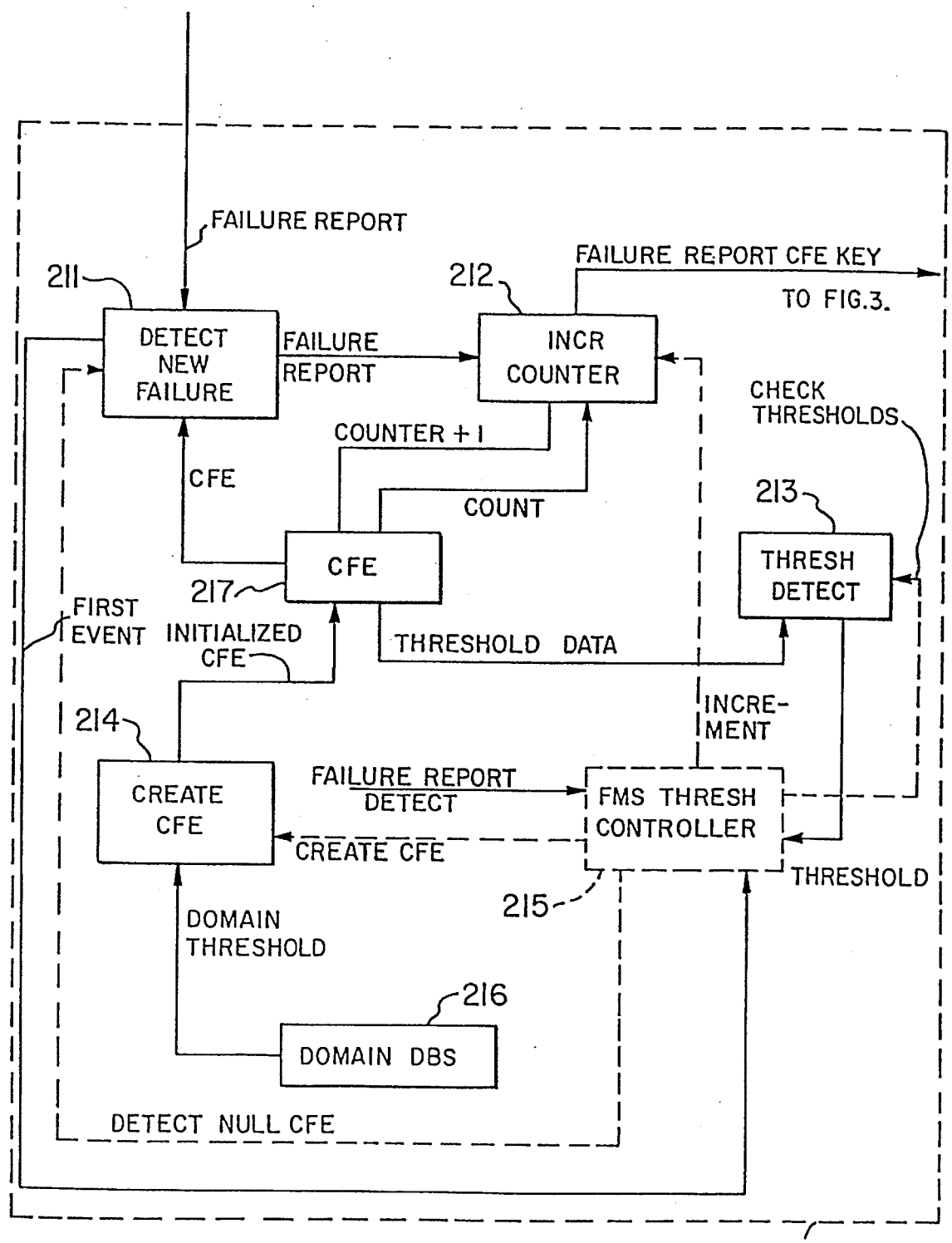
FIGS. 2 and 3 illustrate the knowledge based resource management system in further detail.
Figure 3:
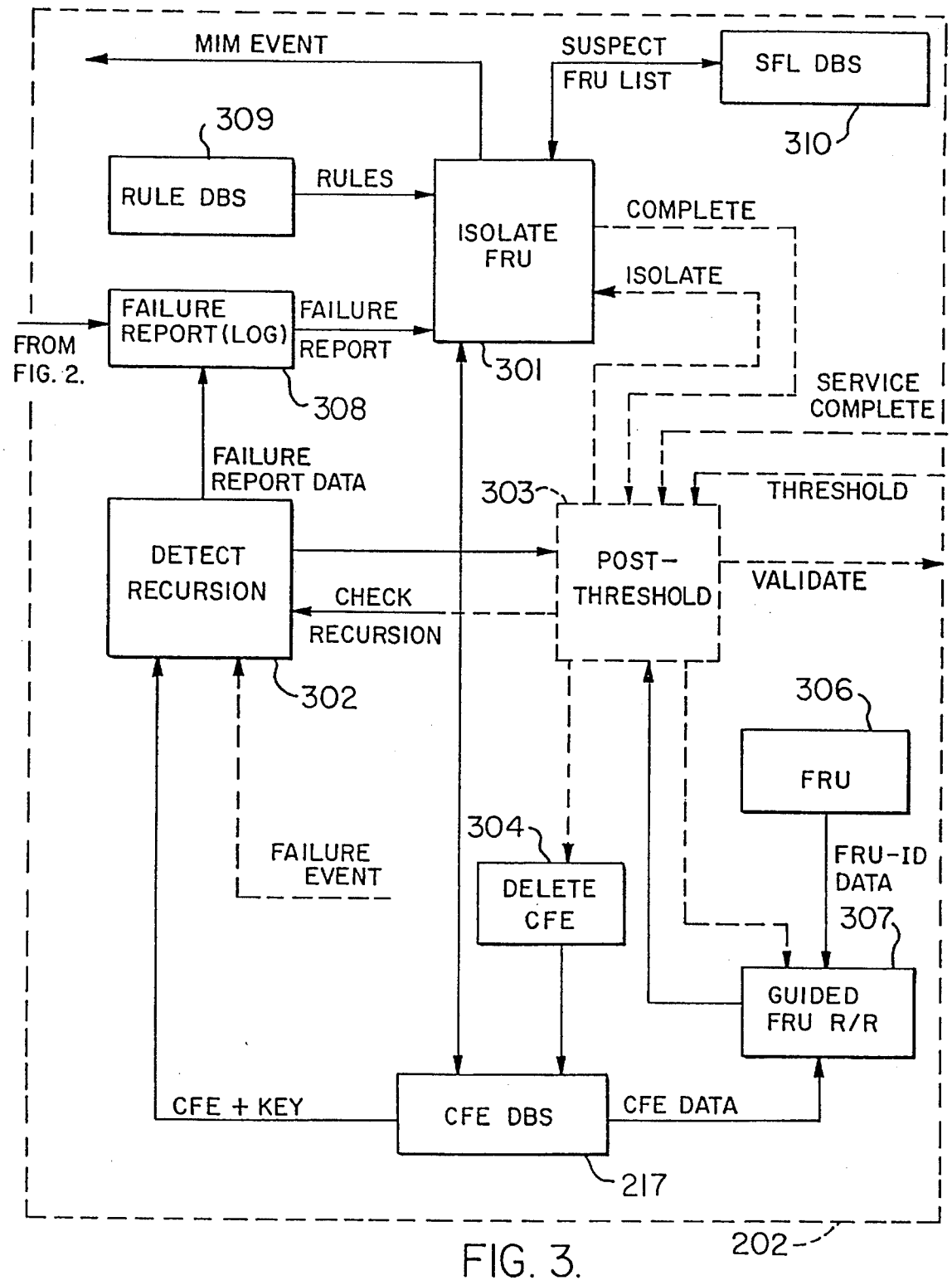

FIGS. 2 and 3 illustrate on a block diagram level the architecture of internal expert system 11. Internal expert system 11 is a special purpose expert system engine, operating in real time, which is tied to a relational/object database 12. Internal expert system 11 includes a facts database which represents the accumulated failure reports, a set of hypotheses (the suspect field replaceable unit list) and an inference engine which includes the rule and procedure execution process. This expert system can learn via recursion and rules modification. This rules database can also be modified from a remote location by either the regional expert system 30 or the central expert system 1. The architecture of the internal expert system 11 illustrated in FIGS. 2 and 3 consists of two major subportions. Prethreshold processing 201 represents the processes that are operational in internal expert system 11 prior to a fault in the associated customer equipment 40 reaching a level of criticality or a sufficient number of instances to require activation of post threshold processing 202 which represents the isolation, maintenance and recovery portion of internal expert system 11.

In this description the term failure domain is used and this term denotes the boundaries within which a given failure operates. The failure domain includes a number of aspects: physical, temporal, severity, persistence, threshold, etc. A number of repetitions of a failure may be required before the failure domain can be established with any precision. This threshold can be varied for each different failure symptom or class. It is obtained and modified empirically and shows up in the system as a new or revised object. The failure management process accrues failure information until a clear picture of the failure domain emerges. At that point a transition occurs to permit the embedded expert system process to perform isolation based on information relating to the failure domain. A composite failure event (CFE) is associated with each emerging failure domain and identifies the states that the failure domain has passed through and summarizes what is currently known about the failure domain. The prethreshold processing block 201 performs the composite failure event creation and the data accumulation.

Failure Report Structure

A multi-path architecture such as that illustrated in FIG. 5 permits a detecting processor, such as C1 (SDI), to coordinate failure recovery within the same domain, within a partially overlapping domain, or on a totally different domain. The object of failure recovery is to complete the customer process. While doing so it is possible to gain considerable insight into a detected failure.

The failure report provides concise summary failure data from the original occurrence as well as information indicative of each recovery step taken during an attempt for customer equipment 40 to recover from the failure. Included in the failure report is a definition of the failing path and each path attempted or the successful path that was used to overcome the failure. In addition, fault symptom codes are provided for the initial event and subsequent recovery actions. Corresponding information is provided about the operation that was in progress in customer equipment 40 at the time that the failure occurred.

Within the failure domain noted above, the following components are included:

| | |
|---|---|
| 1. Physical Locale: | An operation attempting to use a component bounded by the locale will result in the failure. |
| 2. Persistence: | Measure of the repeatability of the failure. Low persistence indicates transience. |
| 3. Functional/ Operational Boundary | A set of functions and/or operations which result in this failure. |
| 4. Severity: | The level of |
| | degradation of system performance which results from this failure. |
| 5. Detectability: | The symptoms by which the failure is identified. |

Figure 6:
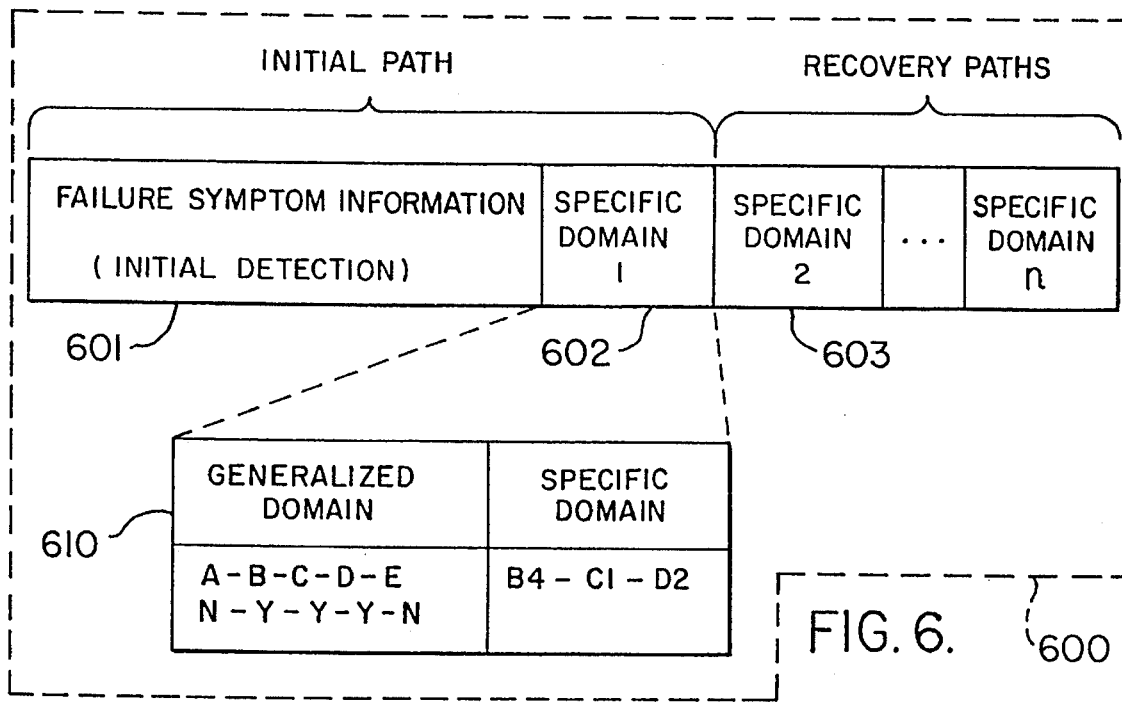
FIG. 6 illustrates a typical format of a failure report.

The detecting processor 501 initializes a failure report 600, in which it places initial symptom data 601 and describes the specific domain 602 in operation at the time of the failure, as illustrated in FIG. 6. It then attempts to recover the operation on the same specific domain. Each recovery action increments a count corresponding to that specific domain. This activity establishes the persistence of a failure within the specific domain. If the processor 501 completes the customer operation successfully on the original specific domain, the failure activity is complete and the failure report 600 is sent to the failure management system. If the processor 501 did not successfully recover within a retry threshold, it allocates a path which is different in some respect from the original failing path and attempts recovery there. The new specific domain 603 is appended to the original failure report 601, 602. A count of the number of attempts is maintained within each specific domain field. The processor 501 continues to vary the specific domain in use until either the operation is successful or the processor 501 determines that recovery options are exhausted and the system cannot recover from the failure. Each specific domain variant is appended to the failure report 600 along with a count of the number of attempts on that specific domain. When either the operation succeeds or the processor 501 gives up, the failure activity is complete, and the failure report 600 is sent to the failure management system. It is possible, but not necessary, to indicate observed failure symptom variants with the domain in which they were observed. In this way, the failure report 600 is able to condense many discrete failure detections into a single informative record.

In operation, the functional detection circuits 20 detect a failure within one of field replaceable units 70–75 and produce a failure report 600 indicative of the failure that has been detected. The failure report 600 is input to the detect new failure report process 211 which compares the domain 602 and symptom 601 information of the received failure report 600 with those previously received and those for which a composite failure event has been created.

Composite Failure Event

Figure 7:
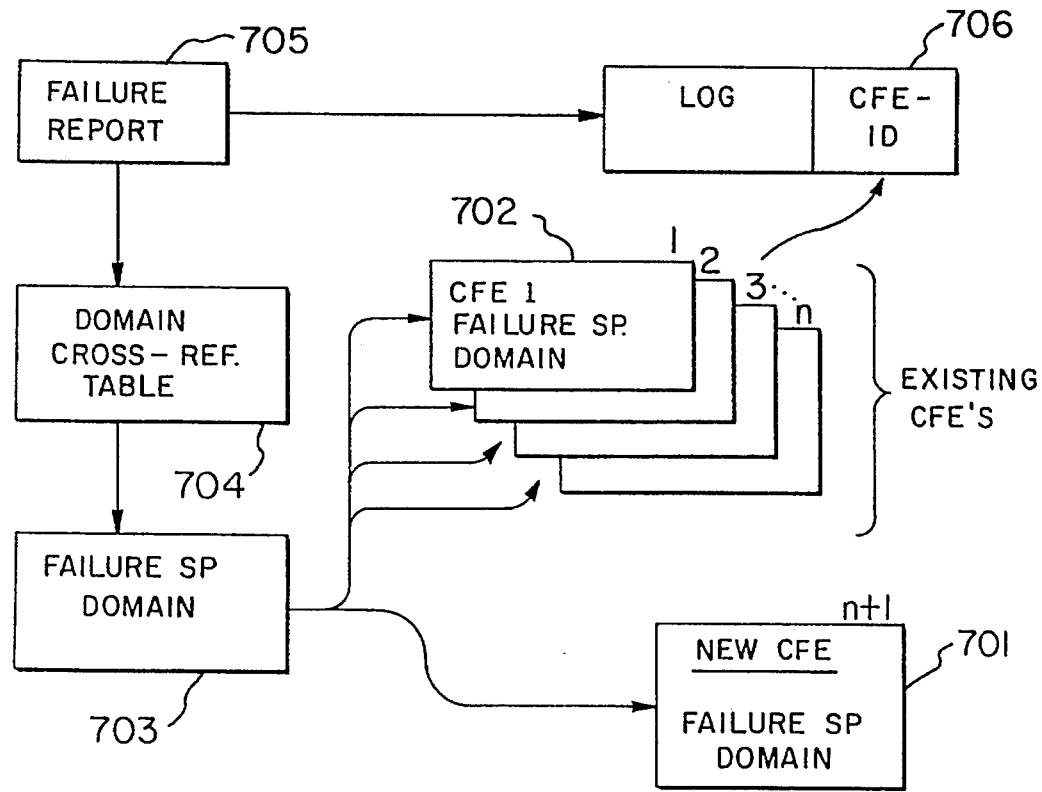
FIG. 7 illustrates the process of generating composite failure events and failure report matching.

A composite failure event 701 is formed from a failure report 705 when that failure report 705 describes a failure occurring in a specific domain which has not been observed before. The composite failure event 701 accumulates failure information to form a composite image of events which are occurring within a failure domain, and tracks the failure domain throughout its life cycle. Each composite failure event 701 is given a unique identity which is used to associate all events which may be logged, as illustrated in FIG. 7.

When a failure report 705 is received by the failure management system, the initial failure symptom 601 is converted to a generalized domain from domain database system 216 which indicates the paths and nodes on which that failure is typically observed. These observations are the result of collecting and analyzing empirical results within a central expert system environment. Additionally, the failure symptom is associated with a severity threshold, a persistence threshold and a characteristic impact to normal operation, also empirically obtained. It is important to note that the generalized domain 610 for the failure may be different in some particulars from the generalized domain observed during operation. Some correlation will always exist. The threshold 804 and domain 802, 803 information from the initial detection are retained in the composite failure event 701.

The failure's generalized domain 610 is converted to a "failure specific domain" 802, 703 by using information embedded in the first operational specific domain 601 in the failure report. The failure specific domain 703 is then matched 704 against all failure specific domains 802 located within existing composite failure events 702. If no match is found, a failure has occurred which does not fit into the profiles of other failures which are currently being tracked. A new composite failure event 701 is created to track the new failure specific domain.

Isolation Expert System

Figure 8:
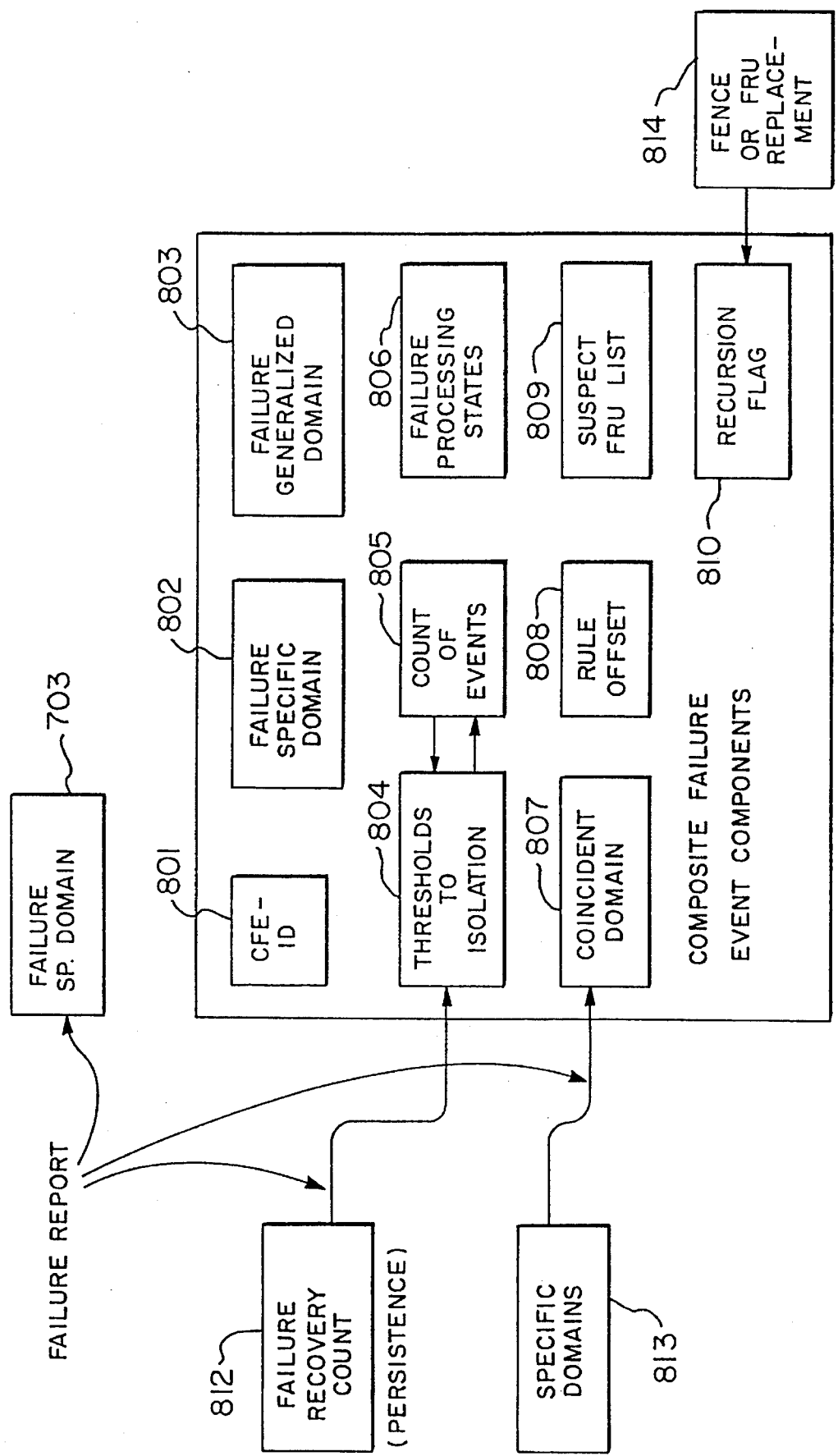
FIG. 8 illustrates the details of a typical composite failure event.

FIG. 8 illustrates the insertion of a failure report into a composite failure event 701. Once the failure specific domain has been matched to a composite failure event specific domain, the persistence count is compared to the persistence threshold 804. If exceeded, the composite failure event 701 is sent to the isolation expert system 301 for isolation. If the persistence threshold is not exceeded, the count of events 805 is incremented to indicate the receipt of a failure report. This count is compared to the severity threshold 804. If exceeded, the composite failure event 701 is sent to the isolation expert system 301 for isolation.

Once the composite failure event 701 has been sent to the isolation expert system 301 for isolation, it is flagged so that the arrival of a subsequent failure event does not cause additional isolation.

Pre Threshold Processing

If a composite failure event has previously been created 702, the detect new failure process 211 transmits data to increment counter 212 to increment the count of failures for this designated composite failure event. The increment counter process 212 retrieves the presently stored accumulated count 805 from composite failure event database 217 and increments this count by one and updates this information in the composite failure event database 217. This updated data is then compared by threshold detector process 213 which determines whether the accumulated count of events 805 for this composite failure event has exceeded the accumulation threshold 804 that was assigned to this failure domain when the composite failure event was first created and the failure domain was inserted into the composite failure event. If the threshold is not exceeded, processing terminates. If however the threshold assigned to this particular composite failure event is exceeded, threshold detect process 213 activates threshold controller 215. Threshold controller 215 passes control to post threshold processing 303.

If the received failure report 705 can not be associated with an existing failure 702, process 211 creates a new composite failure event 701. It is accomplished by process 211 activating threshold controller 215 which creates a new composite failure event. This is accomplished by activating process 214 which is the create composite failure event process which retrieves data from the failure domain database 216 in order to create a new composite failure event. The domain data received with the failure report 705 is used to access the domain table in the domain database which supplies threshold and severity data for the composite failure event.

Post Threshold Processing

FIG. 3 illustrates the post threshold process 303 and its interaction with various databases and with the isolate field replaceable unit process 301. The post threshold processing element 303 operates in conjunction with the isolate field replaceable unit element 301 to perform the isolation processing step, including updating the suspect field replacement unit list contained in database 310 and the rule database 309. If the failure presently analyzed is a recursion event, then the detect recursion element 302 determines that this failure is a replication of priorly detected failures and adjusts the suspect FRU list 310 for the composite failure event to eliminate the field replaceable unit from consideration whose fencing or replacement caused the recursion flag to be set. This apparatus also executes the rules contained within rule database system 309 to remove as many suspect field replaceable units as possible from the suspect field replaceable unit list contained in the suspect field replaceable unit list database 310. The rules may invoke diagnostics, examine data, around potential failed units, reconfigure and other activities, in order to eliminate field replaceable units from the suspect field replaceable unit list. The goal of the process is to focus on a single likely field replaceable unit that is causing the detected failure. A guided field replaceable unit process 307 is included to interface with a craftsperson to manually replace a failed field replaceable unit and test the replacement field replaceable unit installed by the craftsperson in place of the failed unit. The isolation process executed in element 301 terminates either when there are rules left but no more field replaceable units in the suspect field replaceable unit list or when the rule action is complete.

Isolation Process

Figure 4:
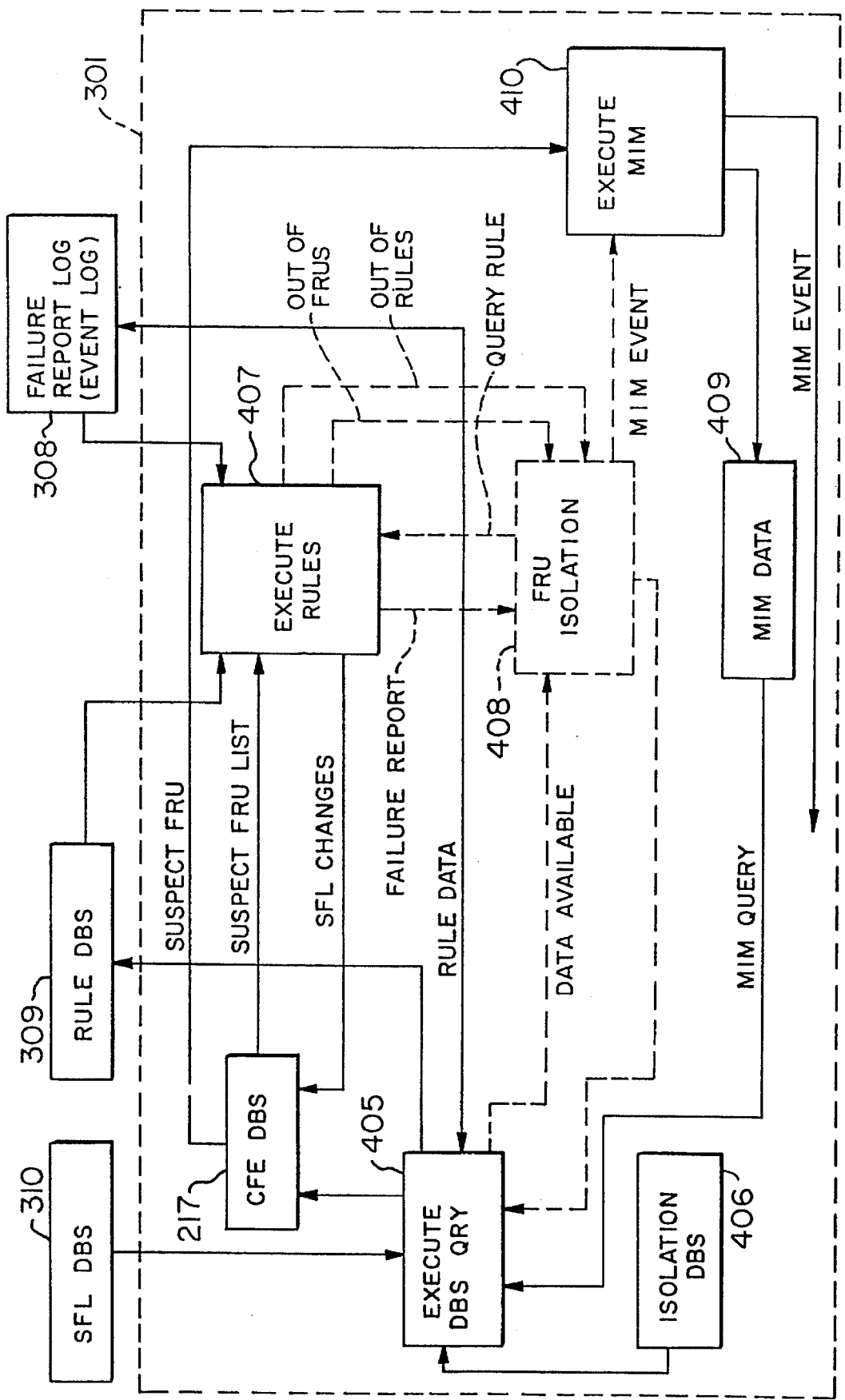
FIG. 4 illustrates additional details of the isolate field replaceable unit function.

FIG. 4 illustrates further details of the isolate field replaceable unit process 301. This process sets up the suspect field replaceable unit list using the domain identification from the composite failure event as a key and translates from the generic domain to the specific domain. The suspect field replaceable unit list is reduced by three mechanisms. First, if the composite failure event recursion trigger is set, then a member of the suspect field replaceable unit list that triggers the recursion is removed. Second, the suspect field replaceable unit list is modified by path coincidence, overlaying all paths from a number of failure reports related to this composite failure event identification. Finally, the rule set pertaining to the domain is invoked and allowed to run to completion. Rules continue to execute in process 407 even after exhaustion of the suspect field replaceable unit list since some rules are command oriented and require execution regardless of the suspect field replaceable unit list. After the rule execution is complete in process 407, the results are used to update the suspect field replaceable unit database 310, the composite failure event database 217, the failure report log 308 and the isolation database system 406.

The failure specific domain 802 contained within the composite failure event (FIG. 8) indicates all nodes which can be suspected as a cause of the failure mode represented by the composite failure event. The specific nodes can be placed within the physical field replaceable unit architecture, a process which yields a suspect FRU list 809 (SFL).

The isolation process seeks to eliminate as many suspect field replaceable units as possible from the suspect FRU list and rank the remaining members in order of likelihood that they caused the problem. The coincident domain 807 (FIG. 8) within the composite failure event figures strongly in this analysis, predisposing the results toward those nodes which were involved in the majority (if not all) of failure events. This may be implemented as a logical AND across all operational specific domains, or as a more sophisticated counting system in which each element of the domain is counted for each appearance.

If at any time a member of a suspect FRU list is replaced, a recursion flag 810 is set within the composite failure event (FIG. 8). If a subsequent failure occurs that falls within the failure specific domain (and hence the composite failure event), it is immediately apparent that replacement of the field replaceable unit did not resolve the failing condition. The recursion flag forces a new round of isolation to occur on the composite failure event (as described above) after first eliminating the replaced member of the suspect FRU list from consideration. The result is a new suspect FRU list with a new ranking.

When a member of the suspect FRU list is replaced, the composite failure event is placed in an interim closure state, in addition to setting the recursion flag. This state is maintained for a predetermined length of time which is sufficient to ensure that the failure has been resolved. At the expiration of the interim closure interval the composite failure event is placed in a closure state, at which time it is logged and eliminated from active comparison with new failure reports.

Global Fence Map

A global fence map exists which identifies each resource node and path in the customer equipment. For instance, in FIG. 5 a global fence map consists of the node-path map for each net such that all nodes A, B, C, D and E within net 1 (500) are identified along with all connections A1+B1, A1+B2; B1+C1, C1+D1; and so on until all possible path connections are identified; the same is done for nets 2 and 3. Then, for each node, the fence states of that node are indicated.

Multiple fence modes may be identified for any node. Although this disclosure refers to only a few fence modes, any number of fence modes may be implemented simply by adding additional modes. Techniques exist for simultaneously identifying all possible fence states which are applied to any node. That is, a node may be simultaneously fenced because a failure exists which affects that node and because that node falls within a region which falls within a diagnostic environment. All node fences for a given fence mode may be released without disturbing underlying fences which govern other fence modes.

Fencing the SFL Node-Path Domain

Given a general domain for net 1 (500) of A+B+C+D+E, it is immediately apparent that resource D4 is fenced if node C2 is made unable to access D4. The same effect may be achieved if C2 is unable to arbitrate with C1 for node E2. Consequently, if a failure is isolated to a suspect FRU list which consists of node D4, the customer equipment may continue in functional operation with minimal degradation if C2 is unable to arbitrate for resource E2. Any mechanism which prevents node C2 from arbitrating for resource E2 is sufficient in order to place the fence. Fencing node D4 by this means is more efficient than fencing it directly because the same fence mechanism may be used to remove E2 from use entirely, by arranging that neither C1 nor C2 is able to use E2. This has the effect of simultaneously fencing D2 and D4 from operation, and the paths D2+E2 and D4+E2. Thus the same fencing technique may be used for three discrete fencing actions. Each node within the specific domain is examined in turn and the rule sequence executed for that node. Each rule in the rule sequence performs one fencing action.

The Fence Mechanism

Figure 9:
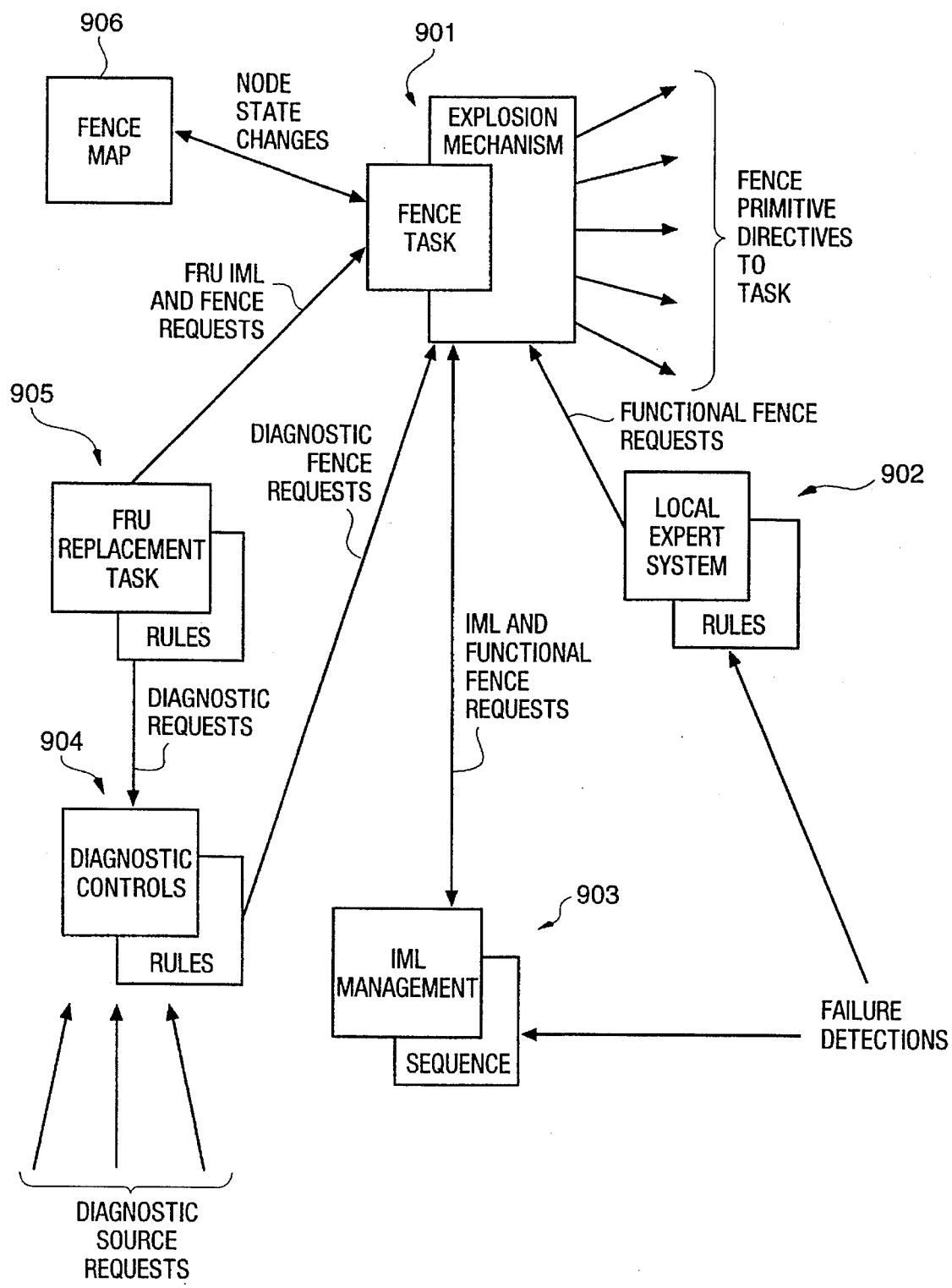
FIG. 9 illustrates in block diagram form the resource management software.

FIG. 9 illustrates in block diagram form the fence control mechanism that is used by the knowledge based resource management system to interact with other elements in the subsystem to manage the fence actions. All fence requests in the illustrated system are initiated by a selected plurality of the system elements, including but not limited to expert system 902 (which corresponds to the internal expert system 11), initial microprogram load (initialization) management 903, diagnostic controls 904 and FRU replacement task 905. The initiated fence requests are transmitted to the fence task 901 via internal operating system messages. The received fence requests are processed by an explosion mechanism 911 associated with fence task 901, using fence map 906 to determine what actions are required to implement the requested fence action.

One example of a fence request initiation is when expert system 902 receives the functional failure detections from functional detection circuits 20 and, using its rules knowledge base 912, determines the possible source of the failure and decides whether to fence that source. In this system, the failure is identified down to a field replaceable unit level, although the concept illustrated herein can be used to localize a failure to a particular device located on a field replaceable unit. Failure detections include a domain that consists of all resources which are specific to the failure, which domain is termed the failure specific domain. Expert system 902 uses its rules knowledge base 912 to refine the failure specific domain and identify only the resources located within the failure specific domain that must be fenced. The resultant fence request is a Functional fence request, which is transmitted to fence task 901. All fences requested by the expert system 902 are placed in the Functional fence mode by the fence task 901, which mode is used to indicate that a node so fenced is suspected of failing within the domain of a functionally-detected failure.

A second example of a fence request is when initialization microprogram load (initialization) management process 903 receives and processes system initialization requests. In a multiply redundant fault tolerant system, such as that disclosed herein, it is often necessary to quiesce and then initialize only a portion of the system while the remainder of the system is being utilized by users. Each initialization task within the initialization management process 903 is therefore stored in sequence memory 913 as a sequence of instructions which describe the individual steps which are needed to execute the identified initialization task. Typical steps in this process include fencing all resources which are required to undergo initialization with an Initialization mode fence, initializing and testing the fenced resources, loading code and finally removing the fences put in place by this task. If resource failures are detected during the execution of an initialization task, they may be routed to initialization management process 903 as a failure detection rather than expert system 902. Initialization management process 903 reacts to a failure detection received from the customer system 10 by limiting the requested initialization task and requesting a Functional fence on the failing resource. Both the Initialization and Functional fence requests are transmitted to fence task 901 for execution. The activated Functional fence mode may place a Functional fence on a resource or a domain of resources in addition to the concurrent presence of the Initialization fence mode, which places an Initialization fence on some or all of the resources in the domain of the Functional fence. When this happens, it is possible to remove either fence at a later time, thereby leaving the other fence intact. This operates as an interlocking fence mechanism, which prevents the accidental placement of a defective resource online. The placement of the resource online represents an application of the Online fence mode, which describes the state of a fenceable node when no fences are placed in it. In this context, the end effect of an initialization operation is to place a set of resources into the Online fence mode.

A third source of fence requests is the diagnostic controls process 904 which receives diagnostic requests from various sources, including an operator panel, an attached host processor, field replacement unit replacement task 905, as well as other system components. Diagnostic requests include data that specify the generalized domain within which diagnostics are to execute. Diagnostic controls process 904 uses its rule set 914 to allocate resources to the generalized domain, forming a domain specific to the diagnostic, termed the diagnostic specific domain. All fenceable nodes within the identified domain are placed in the Diagnostic fenced mode and the Diagnostic fence request is transmitted to the fence task 901 where it is executed. Diagnostic fences are used to remove and isolate a portion of the system from active customer use. In this way, Diagnostic fences protect the customer used portion of the system from any errors which may be injected by executing a diagnostic within the diagnostically fenced portion of the system.

A fourth source of fence requests is the field replaceable unit replacement task 905 which executes a series of rules 915 in order to effect the fencing, removal, replacement, diagnostics and unfencing of a target field replaceable unit. Field replaceable unit replacement task 905 first identifies the domain, or resource subset, of the system which is effected by the field replaceable unit removal. This identified domain is placed under a combination of Field Replaceable Unit and Initialization fences by transmitting Field Replaceable Unit and Initialization fence requests to the fence task 901. The Field Replaceable Unit fences are placed directly on the field replaceable unit that is to be replaced and indicate to the remainder of the system that this field replaceable unit is scheduled to be replaced. In this manner, all outbound paths from that field replaceable unit are internally fenced and all inbound paths from that field replaceable unit are placed in a disabled state. The Initialization fences are first used to create a boundary zone around the control region, which prevents interaction with any resources which are shared among control regions. Then, Initialization fences are placed on the nodes which reside internal to the control region to force paths and nodes within the control region into a quiesced state from which an initialization can be performed later. It can be seen that both Field Replaceable Unit and Initialization fences can often be placed on the same field replaceable unit.

It is often the case that local expert system 902 has placed a Functional fence on the resources that are the target of the field replaceable unit replacement operation. In this case, the Field Replaceable Unit, Functional and Initialization fence modes may coexist on the same nodes. Field replaceable unit replacement task 905 removes any Functional fences after placing Field Replaceable Unit fences on the target resources and Initialization fences on the control region. The additional fence modes are used as an interlocking mechanism during the removal of Functional fences, to prevent any fenced node from being accidentally placed in customer use.

Following the field replaceable unit replacement, the field replaceable unit replacement task 905 initiates a diagnostic request to diagnostic control 904, to test the target (replaced) field replaceable unit. During the diagnostic sequence, diagnostic controls 904 identifies the diagnostic specific domain and overlays the identified fence nodes with a Diagnostic fence. On completion of the diagnostic procedure, all Diagnostic fences are removed; however, the Field Replaceable Unit and/or Initialization fences within the target control region remain to perform the interlocking function. It is entirely possible that during the diagnostic phase some resources are required for the Diagnostic fence action, and unfenced at the conclusion of the Diagnostic fence action. It can be seen that during this phase, same nodes may have Diagnostic and Field Replaceable Unit fences on them, some nodes may have Diagnostic and Initialization fences on them, and some may have all three fence modes concurrently active.

The last action taken by the field replaceable unit replacement task 905 is to remove the Field Replaceable Unit fence on the target field replaceable unit, and initiate an initialization on the Initialization fenced domain. The appropriate initialization task is executed by initialization management process 903 using one of the initialization sequences stored in sequence memory 913.

Fence Techniques

Two general classes of fences are implemented by the system. The first general class of fences is a binary fence, the second class of fences is a state sequenced fence. A binary fence exists when any fence state disables the node and the node is enabled when the last fence mode is removed from the fence state. A state sequenced fence exists when any change in fence mode requires a change in the state of the target node.

The simplest method of binarily fencing a node is to electronically disable the drivers or receivers on a bus path. Unfencing is performed by enabling a receiver and suppressing or clearing any error conditions which may be waiting on the receiver.

Another simple method of fencing a node is to place a flag in software which prevents the software from allocating that node. Unfencing is accomplished by removing the software flag. This technique is used in cases where the electronic disabling of the node is not necessary to prevent the node from impacting the path.

More complex mechanisms may be required in order to implement a binary fence. For instance, a block of cache memory may be removed from service by reinitializing the rest of cache memory to prevent addresses within the fenced block from being accessed. The block is unfenced through a similar reinitialization mechanism.

More complex still is the case where fencing a node requires numerous fence steps, as is the case where a processor requires fencing. First, the processor's access to all shared resources is removed, then the processor's access to all local resources is removed. Processor interrupts are disabled to various points in the system. Finally, the processor is quiesced and halted. In spite of the complexity of this procedure, it is still a binary fence implementation.

Some nodes are themselves sequenced through multiple states. For instance, an array device is manipulated through a variety of operational steps and any transition in fence state may require a corresponding change in the operational state of the device. For instance, an array device is initially placed in a spare state when the device is online. Functional code can then move the device into a customer array as needed. To place the device in a diagnostic state, the device must be removed from the customer array and placed in a logical state in which functional code relays commands to the device, and status and data from the device. If the device fails or is to be removed, it is placed in a state where commands are not relayed and only certain status is received.

The case of shared memory is more complex. In the subsystem of the present invention dually redundant shared memories are each connected to all processors by an independent shared memory bus. The contents of both shared memories must be simultaneously updated with identical data. Any mismatch causes a catastrophic failure and requires a full subsystem initialization.

Fencing of the shared memory goes through a single step: all shared memory bus nodes for that shared memory are disabled to all processors. This is true for Field Replaceable Unit, Functional or Initialization fencing of the shared memory. If the diagnostics are to be executed, a Diagnostic fence is added to the shared memory bus nodes in such a way that one of the shared memory bus nodes is enabled for read/write while the others remain forced off the bus. Following diagnostics, the shared memory bus nodes are eventually placed in an initialization state where all processors are removed from that bus. A synchronization Diagnostic fence is then placed, in which fence all processors but one are placed in read from one but write to both shared memories; one processor is used to bring the contents of both shared memories identical. Finally, removal of the Initialization fence causes all processor nodes to be placed in dual read/write mode.

Fence Mode Transitions

Figure 10:
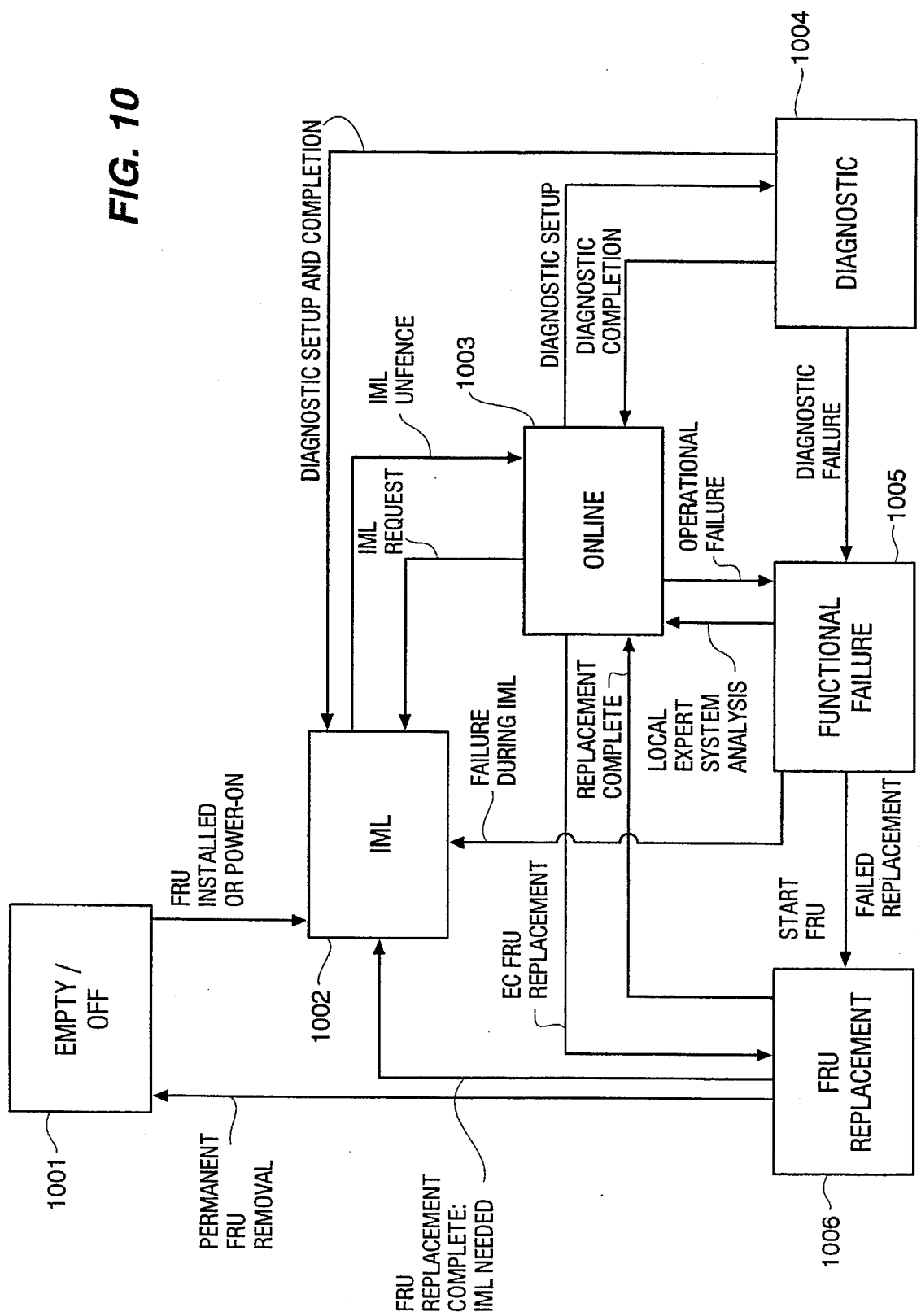
FIG. 10 illustrates in block diagram form a set of transitions that may be occupied by any customer system fenceable node.

Each fenceable node undergoes a standard set of fence mode transitions as shown in FIG. 10. In addition to occupying any one of the Online, Initialization, Diagnostic, Functional, Field Replaceable Unit or Empty fence modes, a node may simultaneously have a combination of these fence modes acting on it. FIG. 10 illustrates, in state diagram form, the process wherein a node moves from one mode to another.

Initially, all field replaceable units within the customer equipment are listed as being in the empty mode (1001). During the initialization process, initialization management process 903 places all detected nodes into the initialization mode 1002. Removal of the Initialization fence from a selected node causes the node to progress to the online mode 1003. Additionally, a diagnostic or other failure detection during initialization may cause a Functional fence to be placed on that node, placing the node in functional mode 1005.

Once placed in the online mode 1003, a node can travel back to the initialization mode 1002, to a diagnostic mode 1004, to a functional fence mode 1005, or to a field replaceable unit management fence mode 1006. As described above, a request from initialization management process 903 causes the node to move to initialization mode 1002. A failure functionally detected by the expert system 902 or initialization management process 903 causes the node to move into the Functional fenced mode 1005. A diagnostic controls process 904 request causes the node to move into the diagnostic mode 1004. A field replaceable unit replacement task 905 fence moves the node into the field replaceable unit mode 1006. From the diagnostic mode 1004, an Initialization fence mode 1002 can be added if the diagnostic domain requires an initialization at completion, or the node can be placed in an online mode 1003 if no initialization is needed. If a diagnostic failure is detected, a Functional fence mode 1005 may be added; then on completion of diagnostics the node remains in the functional mode.

From the functional failure mode 1005, the functional mode may be directly removed, causing the node to be placed in the online mode 1003. If an initialization is required, then an Initialization fence mode 1002 may be added prior to removing the Functional fence mode 1005, placing the node in the initialization only fence mode. Alternatively, the node may be scheduled for field replaceable unit replacement by field replaceable unit replacement task 905 with the addition of a Field Replaceable Unit fence mode 1006. Normally, the Functional fence mode 1005 is removed while the Field Replaceable Unit fence mode 1006 is in place.

From the Field Replaceable Unit fence mode 1006, the node may be completely removed from operation by adding the Empty fence mode 1001 or it may be restored to customer operation by removing the Field Replaceable Unit fence mode 1006, placing it in an online mode 1003. If an initialization is required, an Initialization fence mode 1002 is overlaid prior to removing the Field Replaceable Unit fence.

Detailed Fence Map Operation

Figure 11:
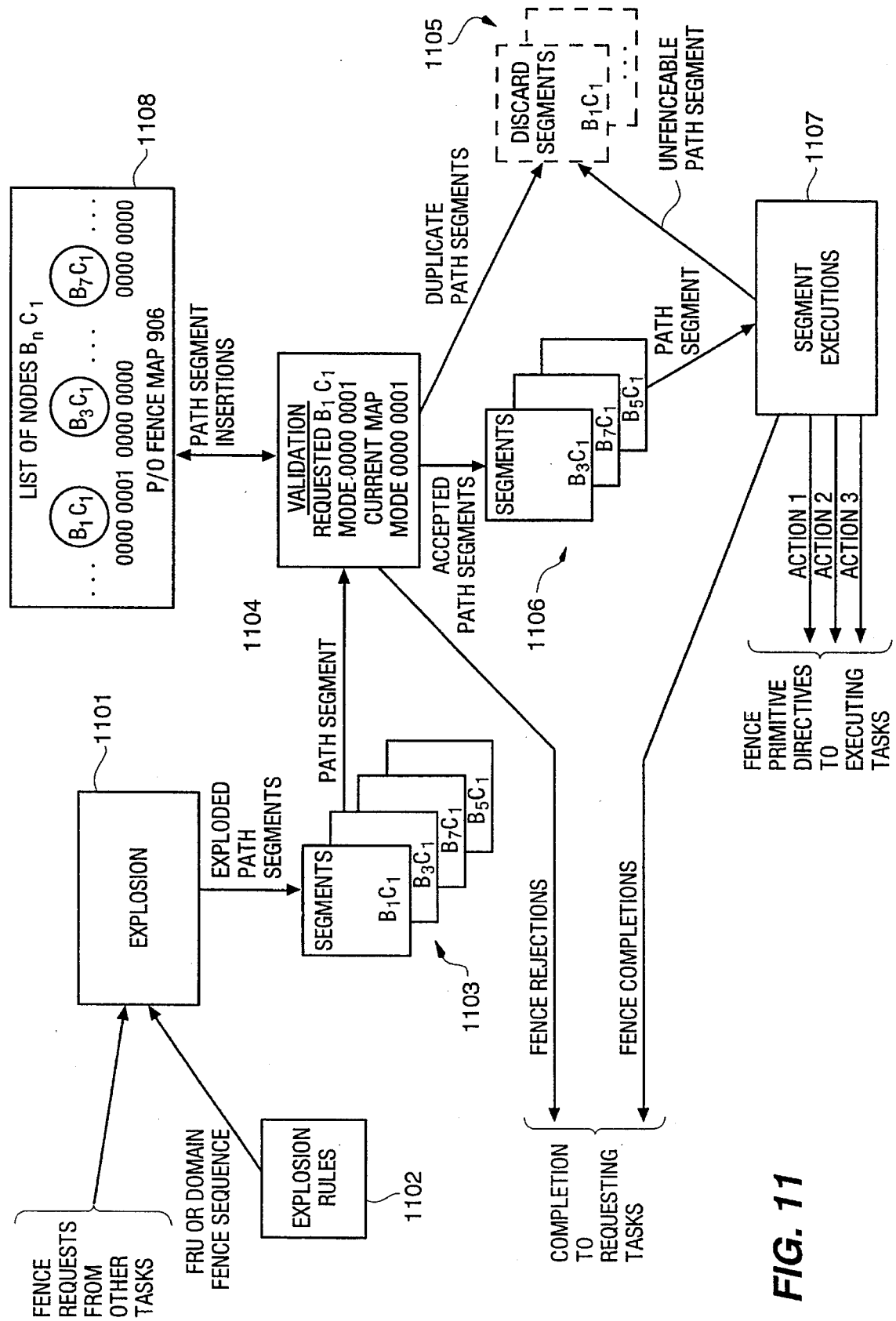
FIG. 11 illustrates in block diagram form the operations internal to the fence task.

Fence map 906 contains representation of each node for which a fence action is possible. In the system of the present invention, a single byte is sufficient for each node to represent its composite fence state. Within the byte, each fence mode 1001–1006 is assigned one bit. A portion of fence map 906 is shown in FIG. 11 as 1108 to illustrate this concept. The notations B1C1, B3C1, . . . B7C1 refer to nodes in the fence map showing path segments connecting processor C1 (501) and field replaceable units B1, B3 and B7 (500). Each of the nodes B1C1, B3C1 or B7C1 can be individually fenced as needed. B1C1, for example, can be fenced as part of the isolation of either processor C1, field replaceable unit B1 or field replaceable unit A1. Using this method, it is possible to mask a bit on and off to represent the fence modes active on the node. For instance, if an Initialization fence mode 1002 is active on the node and the low order bit is assigned to the Initialization fence mode 1002, then (in binary):

0000 0000= Online (absence of fences)

0000 0001= Initialization of fence mode as shown in table 1108.

Likewise, additional modes are identified by corresponding unique assigned binary bits. The following Table 1 illustrates typical fence assignments.

TABLE 1

```
0000 0000 = Online (absence of fences)
0000 0001 = Initialization fence mode
0000 0010 = Diagnostic fence mode
0000 0011 = Diagnostic and Initialization
            fence modes
0000 0100 = Functional fence mode
0000 0101 = Functional and Initialization
            fence modes
0000 0110 = Functional and Diagnostic fence
            modes
0000 0111 = Functional, Diagnostic and
            Initialization fence modes
0000 1000 = Field Replaceable Unit fence mode
0000 1001 = Field Replaceable Unit and
            Initialization fence modes
0000 1010 = Field Replaceable Unit and
            Diagnostic fence modes
0000 1011 = Field Replaceable Unit,
            Initialization and Diagnostic
            fence modes
0000 1100 = Field Replaceable Unit and
            Functional fence modes
0000 1101 = Field Replaceable Unit, Functional
            and Initialization fence modes
0000 1110 = Field Replaceable Unit, Functional
            and Diagnostic fence modes
0000 1111 = Field Replaceable Unit,
            Functional, Diagnostic and
            Initialization fence modes
0001 0000 = Empty fence mode
```

Additional fence modes can be overlaid as necessary to the empty mode.

Fence Task Operation

FIG. 11 illustrates the operation of fence task 901. A fence request is received from other specific tasks 902, 903, 904, 905. The fence request contains data that identifies either a specific domain, or a specific field replaceable unit, or sub-field replaceable unit to instruct the fence task 901 on the boundaries of the region to be fenced. The fence request is passed by the fence task 901 to the explosion function 1101, which uses explosion rules 1102 to transform the fence request into its component path segments 1103. An explosion rule takes the form of a function based on a specific domain or a field replaceable unit and its path definitions, based upon the phrasing of the request. If in specific domain form, the region specified by the domain is exploded first into path segments 1103 affecting resources which are shared among processors (shared resources), then into path segments 1103 affecting resources which are autonomous to a single control region (autonomous resources). A request which uses the field replaceable unit/path form is expressed in terms of FRU1-(FRU2)-(Path). The target field replaceable unit is specified as FRU1. If path is specified, it limits the scope of the fence action to all nodes on the path connected to FRU1. If FRU2 is specified, it limits the scope of the fence action to all paths connecting FRU1 and FRU2. If FRU2 and path are both specified, it limits the scope of the fence action to the single path between FRU1 and FRU2. The explosion rule for this type of request takes the form of the following pseudo-code:

```
IF no path is specified
    Create a Path Segment 1103 for each path
        interserting FRU1.
ELSE IF a path is specified
    IF FRU2 is unspecified
        Create a Path Segment 1003 for each
            node attached to the specified
            path.
    ELSE
        Create a Path Segment 1103 for the
            nodes connecting FRU1, Path and
            FRU2.
    END IF
END IF
```

A Path Segment 1103 is a structure of the form:

FRU1-FRU2-Path-Primitive-Mode where FRU1-FRU2-Path describe nodes on the two FRU's and the path connecting them, Primitive describes the fencing action to be taken on the nodes, and Mode identifies the fence mode to be applied to that node (1001–1006). A primitive is typically of the form:

FENCE (disable) node x,

UNFENCE (enable) node x, or

ALTER the State of node x.

The explosion function 1101 creates Path Segments 1103 according to explosion rules 1102 regardless of whether the Path Segments 1103 ought to be executed or even could be executed. Determination of whether the Path Segments 1003 ought to be executed is accomplished in validation of path segments function 1104. Determination of whether the remaining Path Segments 1103 can be executed is accomplished in segment execution function 1107.

Validation of path segments function 1104 examines each proposed path segment 1103 in turn. The node identified by the Path Segment 1103 is located in fence map 906. The fence mode contained in the Path Segment 1103 is compared to the fence modes marked in the map. The following logic is then implemented:

```
IF this is a fence action
AND the Path Segment mode is not marked in the
            map for this mode,
    Accept the Path Segment 1106.
ELSE IF this is an unfence action
AND the Path Segment mode is marked in the map
            for this node,
    Accept the Path Segment 1106.
ELSE this is a duplicate segment; discard it
            1105.
```

This process is illustrated in FIG. 11. Path Segments 1103 have been exploded from a request to fence processor C1 (501). Fence map entries 1108 for B1C1 show that it is presently in the initialization operational mode (0000 0001). If the requested fence mode is also the Initialization mode 1002, then validation function 1104 identifies a duplicate Path Segment 1103 for B1C1 1105. Since B3C1 is shown in fence map 1108 as presently being in the Online operational mode 1003 (0000 0000) the Path Segment 1103 for B3C1 is accepted 1106.

As Path Segments 1103 are accepted, fence map 906 is marked with the proposed fence modes overlaying the nodes described by the Path Segments 1103. In each accepted Path Segment 1103, the prevalidation state of the affected node is preserved in the structure which contains the Path Segment 1103. For diagnostic mode fences, a special test is made:

```
IF this is a fence action
AND the Path Segment mode IS marked in the map
for this node,
        Reject the fence 1108.
END IF
```

This mechanism prevents a single resource from being shared by two diagnostics which are operating independently in separate domains. If the duplicate fence were allowed, the first diagnostic to complete would return the resource to customer operation while the second diagnostic was still using it.

Finally, as each Path Segment 1103 is inserted into the fence map, system availability is calculated as a function of the resources and paths available to the customer. Each path which is fenced incurs a penalty on resources available to the customer. If in the process of inserting fences the level of resources available drops below the minimum availability necessary for continued customer operation, the fence request is rejected 1108. This mechanism ensures that the customer continues to operate regardless of the state of internal resource availability.

An UNFENCE request is never rejected. Rejection of a FENCE request 1108 involves restaging the fence as an unfence request. This is accomplished by reinserting all accepted Path Segments 1106 into the map as if they had been UNFENCE actions. This process serves to restore the fence map 906 to its condition prior to validation 1104.

Segment execution 1107 receives all accepted Path Segments 1106 and processes each one in turn. Segment explosion 1107 has logic which detects whether the Primitive contained in the Path Segment 1103 can be issued to a receiving task for implementation, and secondly, whether the Primitive needs to be executed at all. For the first test, segment execution 1107 identifies the processor which controls the execution of the Primitive contained in the Path Segment 1103. If the processor is not in a an Online fence mode 1003, segment execution attempts to find an alternative processor which can execute the Primitive. Failing that, segment execution discards the Path Segment 1105 since no fence action is possible.

Having found a processor, segment execution 1107 then identifies the type of fence action as being either binary or state sequenced. If the fence action is a binary fence, and the node is already in the target binary state, segment execution discards the Path Segment 1105. Otherwise, if the type is state sequenced or if it is binary and the node is NOT already in the binary state, the fence primitive is packaged into a message which is sent to the executing task.

Human Input

Human input to the expert systems is allowed at any level, since it will be propagated to all levels through system interaction. It occurs in response to Machine Initiated Maintenance events 410.

The machine initiated maintenance event may reveal one or more Suspect FRUs, or no Suspect FRUs at all. The former case requires FRU change interaction; the latter case is known as an Engineering Alert MIM because it typically involves central expert system and engineering resources to assist in problem resolution.

The unique identity of the composite failure event is also contained in the machine initiated maintenance event, and provides a problem reference which is used by the craftsperson when replacing FRUs to resolve the machine initiated maintenance event. Where one or more Suspect FRUs are indicated in the machine initiated maintenance event, the craftsperson invokes an interactive dialogue called Guided FRU Replacement 307, or GFR. The craftsperson uses guided FRU replacement 307 to select the composite failure event identity for which the machine initiated maintenance event was sent, and selects the field replaceable unit to be replaced from the suspect FRU list that is continued in the composite failure event. Guided FRU replacement 307 in turn initiates fencing at the required level so that the field replaceable unit can be replaced without removing subsystem power, and encourages the craftsperson to proceed with the replacement. Guided FRU replacement confirms the replacement and invokes a series of validation diagnostics which test the field replaceable unit in isolation. On successful completion, guided FRU replacement places the field replaceable unit in a closely-monitored functional operation with the craftsperson present. Following this, guided FRU replacement sets the recursion flag (810) in the composite failure event, and alters the state (806) of the composite failure event to reflect an initial closure of the event.

All diagnostic and FRU change information is captured in the failure report log 308, which also contains the underlying failure reports. As with the failure reports, diagnostic and FRU change information are keyed with the composite failure event's unique identity. This permits internal or external reconstruction of the problem.

Fencing for FRU Replacement

If in net 1 the resources of D1 and D2 exist on a single field replaceable unite 504, and that field replaceable unit is to be removed from the customer equipment without halting concurrent customer operation through net 1, it is necessary to configure node C1 so that no node B (B1, B3, B5, B7) may access or interrupt node C1 if such an access or interrupt would require further access to a resource D or resource E. This manner of fencing has the effect of removing node C1 from customer operation.

In addition, it is necessary to condition paths D1+E1 and D2+E2 such that physical removal of the field replaceable unit 504 does not cause spurious noise on those paths which would prevent continued customer operation of paths D3+E1 and D4+E2. This may be accomplished by any of several methods of electrical and/or logical isolation which are common in the art. Subsequent to the fencing described, the field replaceable unit 504 may be removed while continued customer operation is present on net 1 using node C2.

In the simplified diagram of the customer equipment of the present invention, Net 1 (500) of FIG. 5 represents a set of field replaceable units organized as a control region within the customer equipment. The control region consists of four channel interfaces A coupled by dual path drivers B to processors C which access dual interface drivers D to cache control logic interface E. Channel interfaces A connect to resources external to the control region but within the customer equipment which are shared among all control regions. Likewise, cache interfaces E connect to resources external to the control region but which internal to the customer equipment and are shared among all control regions within the customer equipment.

Field replaceable unit replacement is under the control of the field replaceable unit replacement task 905 and performs field replaceable unit replacement using a set of interlocking fences. For example, to replace field replaceable unit B1 within a control region 500, the following rules are executed:

1. Instruct the fence task 901 to place an initialization mode 1002 domain fence on the control region. The initialization mode 1002 performs an interlocking role, placing the processors C into a quiesce state and allowing higher order fences to be placed at the field replaceable unit level without altering the state of the processors.
2. Instruct the fence task to place a field replaceable unit mode 1006 fence on the target field replaceable unit B1.

This fence executes the on-field replaceable unit resets to lock all interface drivers and conditions all hardware to an operationally neutral state. At this point, the portion of the fence map on which the nodes for B1 are represented shows a combination of other initialization and field replaceable unit fences.

3. Execute the field replaceable unit replacement.
4. Call the diagnostic controls task 904 with a field replaceable unit level diagnostic request. Diagnostic controls explodes the field replaceable unit request to a series of individual diagnostic requests. For each diagnostic request, diagnostic controls determines the resource requirements both internal and external to the control region and compiles a diagnostic domain in which those resources are identified. This domain is sent as a diagnostic mode domain fence to the fence task 901. The fence task 901 explodes the domain fence into component primitives and issues the primitives to fence the requested resources. At this point, the portion of the fence map 906 on which the nodes for B1 are represented shows a combination of initialization, diagnostic and field replaceable unit fences.
5. At completion of each diagnostic, the diagnostic controls task re-issues a diagnostic mode 1004 domain unfence request to the fence task 901. The fence task 901 explodes the domain fence into component primitives and issues the primitives to unfence the requested resources. At this point the portion of the fence map 906 on which the nodes for B1 are represented has returned to the state described at the completion of step 2 above. Note that the initialization fence 1002 which is overlaid on the control region serves as an interlock which prevents the control region from resuming normal customer operation.
6. When all diagnostic operations have complete, the guided field replaceable unit replacement rule is executed, which performs a field replaceable unit mode unfence of the target field replaceable unit B1. Execution of this rule within the guided field replaceable unit replacement operation causes this operation to issue a field replaceable unit mode unfence command for the field replaceable unit B2 to the fence task 901. The fence task 901 explodes this field replaceable unit unfence command into the component unfence sequence by which field replaceable unit B2 may be placed in the online mode 1003. Again note that the initialization fence on the control region still serves as an interlock preventing the control region from accidentally being placed in customer service.
7. The final guided field replaceable unit replacement rule instructs the fence task 901 to initiate a control region initialization sequence. This operation causes the fence task to issue a control region initialization to the initialization management process 903, which carries out the sequence described hereinbelow in the Detailed Initialization Operation section.

Diagnostics are executed in conjunction with field replaceable unit replacement and are described in that fashion above. Diagnostic may also be executed independently of field replaceable unit replacement where the fence activity is a subset of those described above.

Fencing a Diagnostic Environment

Every diagnostic test requires a target resource, which is that resource whose integrity is to be tested, and an environment, which is that collection of resources the diagnostic requires in order to facilitate its execution. The diagnostic environment includes the target of the diagnostic, and is defined by a general and a specific domain.

The caller of the diagnostic is supplied with the general domain for the diagnostic, which defines the diagnostic environment required for any invocation. The caller of the diagnostic then supplies the specific nodal information necessary to identify the specific domain which describes the specific environment in which the current diagnostic invocation is to be executed.

Suppose, for example, that a diagnostic exists which tests a function of type D, and that the failure evaluation process wishes to execute that diagnostic with D1 (505) as a target. The diagnostic also requires an environment which consists of a node C and a node E. The general domain which the process uses for this diagnostic then contains C+D+E. The process converts each node within the general domain to a specific counterpart, beginning with the target of the diagnostic, or D1. Since the general domain consists of a node C, and the only path between a node C and node D1 consists of C1+D1, then the process assigns node C1 to the diagnostic environment. In addition, a node E is required. Since only one path exists between Node D1 and a node E, the process assigns node E1 to the diagnostic environment. The diagnostic specific domain, then, consists of nodes C1+D1+E1.

These nodes are fenced for diagnostics by allowing the diagnostic to use them but restricting interaction with customer-initiated processes. This may be accomplished by removing access between any node B (B1, B3, B5, B7) and node C1. Likewise, node E1 must be removed from any customer access which uses node C2, by placing a similar fence on its use. Finally, because node D2 does not belong within the diagnostic environment defined in the specific domain, and yet it cannot operate without a node C, it is not permitted to interact with node E2. Once the diagnostic environment is attained, the diagnostic may be executed with no possibility of interrupting customer activity which is using nodes C2+D4+E2.

Fencing an IML Environment

Initial Microprogram Load (initialization) of a function may be executed concurrently with customer operation in the same way that diagnostic tests are executed concurrently, and through the same means. An initialization environment is defined in terms of a general domain for the function being loaded. For instance, the initialization environment for a node C (501, 502) may include four nodes B plus two nodes D. A specific domain is then created for the target which is to be loaded. Once fenced, the initialization operation may proceed without affecting customer operation on any other node C.

Detailed Initialization Operation

Customer equipment bringup may consist of an initialization of all control regions simultaneously, or of any one or a combination of control regions asynchronously. Control region initialization is under the control of the initialization task 903 and consists of the general sequence:

1. Initialize all nodes within the domain which will undergo initialization to an initialization fenced state.
2. Verify the existence of the field replaceable units necessary to bring up the control region.

3. Verify the existence of sufficient external resources to enable the control region to be brought up and operate successfully.
4. Test the processors C and load code. Instruct the fence task 901 to remove the initialization fences on processors C.
5. Using processors C, test all interfaces connecting processors C to the rest of the control region. As each interface tests successfully, instruct the fence task to remove the initialization fence on that interface.
6. In a similar fashion, test the nodes which govern interface activity to resources external to the control region. As each interface tests successfully, instruct the fence task to remove the initialization fence on that node.

At the end of step 6, the control region has been placed in functional operation and enabled to process customer work arriving on channels A. Failure conditions may be encountered in any of steps 2–6. A failure detected in either of steps 2 or 3 is caused by a missing field replaceable unit or one that is incompatible with its placement. The initialization operation is abandoned, leaving the initialization fence in place on the entire control region. The fence task can, beginning with step 4, communicate fence actions to processors C for execution. A failure detected at step 4 results in functionally fencing the failing processor C and the initialization continues with the remaining processors C. If both processors C fail, the fence task is instructed to functionally fence both processors C and abandon the initialization task. A failure that occurs at either step 5 or 6 results in the fence task being instructed to functionally fence the failing interface and continue the initialization. If sufficient interfaces fail to cause the control region to be unable to execute customer work, perform the additional steps of initialization fencing the processors C and all other nodes within the control region.

Placing a Spare or Reserved Resource in Operation

Assume that in net 1 (500) it is desired that only one node E is in operation at a time. In the global node map, then, the node E which is not in functional use will be fenced in Offline mode, making two nodes D unavailable to customer operation. If, then, a failure or other occurrence causes a need to remove the other node E from service, it is possible to simultaneously fence that node E to remove it from customer operation and insert the redundant node E by removing its fences, enabling its paths D+E for customer operation.

The same results may be achieved by first suspending customer operation within Net 1 (500) by making nodes A1–A4 unavailable to operations external to the net, then switching nodes E, then re-enabling nodes A1–A4.

While a specific embodiment of this invention has been disclosed, it is expected that those skilled in the art can and will design alternate embodiments of this invention that fall within the scope of the appended claims.

We claim:
1. Apparatus for controllably isolating operational elements in a customer system, which customer system includes a plurality of operational elements, each interconnected to at least one other operational element via an interconnection path, comprising:

means for storing data identifying all said operational elements and said interconnection paths;

means for retrieving a portion of said data from said storing means to identify a subset of said operational elements and all said interconnection paths connected to said subset of operational elements;

means for identifying a selected subset of operational elements for testing;

means for verifying that said subset of operational elements is not in use;

means, responsive to said subset of operational elements not being in use, for identifying all said interconnection paths connected to said subset of operational elements;

means for writing data identifying said subset of operational elements and said identified interconnection paths connected to said subset of operational elements into said retrieving means to disable said identified subset of operational elements;

means for selectively disabling the use of said subset of operational elements, as identified by said retrieving means, by said customer system, comprising:

means for isolating said subset of operational elements by disabling any said interconnection paths connected to said subset of operational elements, means for listing at least one fence mode operational on said subset of operational element in said portion of said data in said retrieving means to identify a mode in which said subset of operational elements is disabled, means, responsive to said apparatus requesting application of a fence mode to one of said subset of operational elements for comparing said requested fence process with said at least one fence mode listed with said portion of said data, means, responsive to said comparing means matching said requested fence mode with one of said listed modes, for accepting application of said requested fence to said mode requested operational element.

2. The apparatus of claim 1 further comprising:

means for detecting the presence of a failure in said associated customer system;

means for generating a failure report which contains data relevant to said detected failure, including an identification of the failure mode and all operational elements that were cooperatively operative during said detected failure;

means for storing said failure report;

means for maintaining a failure analysis history containing data identifying each of said operational elements and associated composite failure data representative of known operational element failures;

means for comparing said stored failure report with said failure analysis history, including:

means for generating a list of said operational elements which are common to a plurality of said failure reports, means for mapping said identified failed operational elements to at least one field replaceable unit containing said listed failed operational elements;

means for identifying at least one failed operational element based on said comparison;

means, responsive to said identifying means, for writing data into a memory to identify said at least one failed operational element and said interconnection paths connected to said identified failed operational element.

3. A method for controllably isolating operational elements in a customer system, which customer system includes a plurality of operational elements, each interconnected to at least one other operational element via an interconnection path, comprising the steps of:

storing data in a memory identifying all said operational elements and interconnection paths;

retrieving a portion of said data from said memory to identify a subset of said operational elements and all said interconnection paths connected to said subset of operational elements;

identifying a selected subset of operational elements for testing;

verifying that said subset of operational elements is not in use;

identifying, in response to said subset of operational elements not being in use, all said interconnection paths connected to said subset of operational elements;

writing data identifying said subset of operational elements and said identified interconnection paths connected to said subset of operational elements into said memory to disable said identified subset of operational elements;

selectively disabling the use of said subset of operational elements, as identified by said memory, by said customer system, comprising:

isolating said subset of operational elements by disabling all said interconnection paths connected to said subset of operational elements, listing at least one fence mode operational on said subset of operational element in said portion of said data in said memory to identify a mode in which said subset of operational elements is disabled, comparing, in response to said apparatus requesting application of a fence mode to one of said subset of operational elements, said requested fence mode with said at least one fence mode listed with said portion of said data, accepting, in response to said comparing means matching said requested fence mode with one of said listed modes, application of said requested fence mode to said requested operational element.

4. The method of claim 3 further comprising the steps of:

detecting the presence of a failure in said associated customer system;

generating a failure report which contains data relevant to said detected failure, including an identification of the failure mode and all operational elements that were cooperatively operative during said detected failure;

storing said failure report;

maintaining a failure analysis history containing data identifying each of said operational elements and associated composite failure data representative of known operational element failures;

comparing said stored failure report with said failure analysis history, including:

generating a list of said operational elements which are common to a plurality of said failure reports, mapping said identified failed operational element to at least one field replaceable unit containing said listed failed operational elements;

identifying at least one failed operational element based on said comparison;

writing, in response to said identifying means, data into said memory to identify said at least one failed operational element and said interconnection paths connected to said identified failed operational element.

* * * * *